United States Patent [19]

Wasmund et al.

[11] 4,181,436

[45] Jan. 1, 1980

[54] MICROSCOPE SCANNING ACCESSORY FOR A PHOTOMETER

[75] Inventors: Heiko Wasmund, Asslar; Walter Klein, Wissmar, both of Fed. Rep. of Germany

[73] Assignee: Ernst Leitz Wetzlar GmbH, Wetzlar, Fed. Rep. of Germany

[21] Appl. No.: 860,107

[22] Filed: Dec. 13, 1977

Related U.S. Application Data

[63] Continuation-in-part of Ser. No. 724,853, Sep. 20, 1976, abandoned.

[30] Foreign Application Priority Data

Sep. 25, 1975 [DE] Fed. Rep. of Germany ....... 2542731

[51] Int. Cl.$^2$ .................... G01J 1/42; G02B 21/00; H01J 31/49
[52] U.S. Cl. ...................... 356/225; 350/18; 250/234
[58] Field of Search ................ 350/17–19, 350/22, 33, 34; 356/219, 225; 250/234, 235

[56] References Cited

U.S. PATENT DOCUMENTS

| | | | |
|---|---|---|---|
| 2,928,952 | 3/1960 | Bednarz | 356/225 |
| 3,851,949 | 12/1974 | Kraft et al. | 350/18 |
| 3,860,935 | 1/1975 | Stauffer | 250/234 |

FOREIGN PATENT DOCUMENTS

1256436 12/1967 Fed. Rep. of Germany .

OTHER PUBLICATIONS

Leitz Brochure, "Microscope Photometer", 620-18-6/Engl, Apr. 1973.

*Primary Examiner*—Rolf G. Hille
*Attorney, Agent, or Firm*—Gilbert L. Wells

[57] ABSTRACT

A scanning accessory for a microscope/photometer, where the photometer system is mounted to or inside an intermediate tube of the microscope and the intermediate tube is provided near or at the one end of its lower side with a coupling system for mounting to the stand and at the opposite side with a coupling system for mounting the ocular, the photometer being inserted into the intermediate tube's beam by means of a beam splitter, a subsequent triple mirror and an ocular. The scanning accessory preferably periodically changes the relative position of the transmitted beam (4a) and of the image (76a) or (76b) of the measuring stop (42) with respect to the microscope image (72) and is located between the photometer system (41–46) and the beam splitter (22) mounted inside the intermediate tube (2) of the microscope for the purpose of enlarging the application possibilities of the microscope/photometer.

16 Claims, 11 Drawing Figures

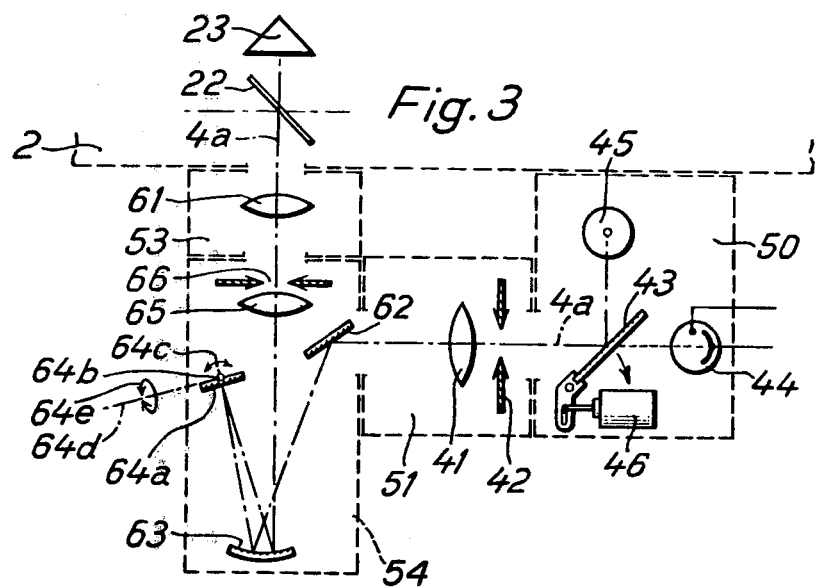
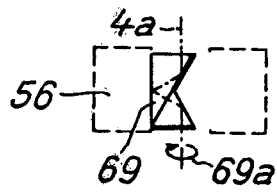
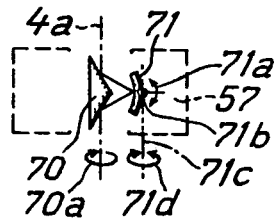
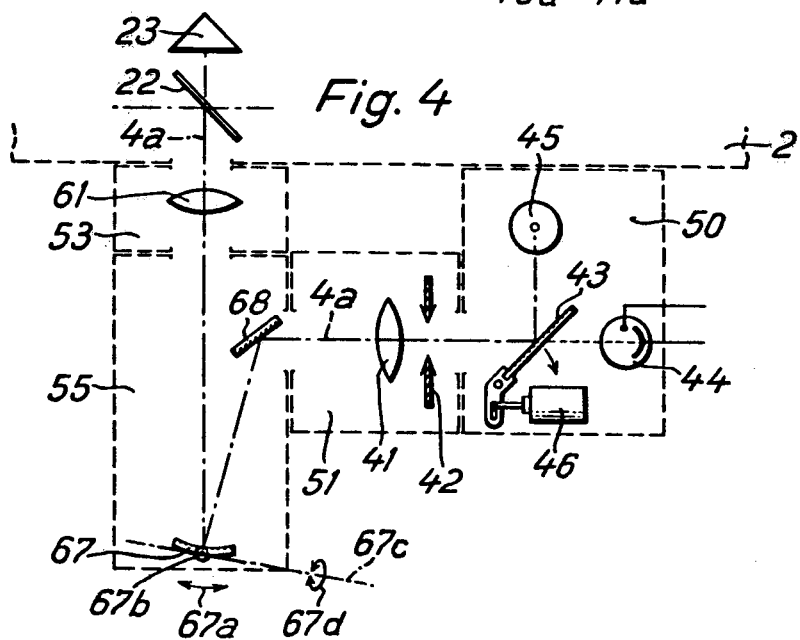

MICROSCOPE SCANNING ACCESSORY FOR A PHOTOMETER

CROSS REFERENCE TO A RELATED APPLICATION

The present invention is a continuation-in-part of application Ser. No. 724,853 filed Sept. 20, 1976, now abandoned.

Applicants claim priority under 35 U.S.C. 119 for Application No. P 25 42 731.0, filed Sept. 25, 1975, in the Patent Office of the Federal Republic of Germany. The priority document is filed in application Ser. No. 724,853.

BACKGROUND OF THE INVENTION

The field of the invention is optics, systems and elements having a compound lens system.

The present invention is particularly related to a scanning accessory for a microscope photometer.

The state of the art of microscopes having a photometer may be ascertained by reference to U.S. Pat. No. 3,851,949, of Winfried Kraft et al, which issued Dec. 3, 1974, the disclosure of which is incorporated herein.

U.S. Pat. No. 3,851,949 discloses a microscope photometer in which the photometer is mounted on or inside an intermediary tube of the microscope. The microscope is provided at or near the end of its lower side with a coupling system for mounting to the stand and at the opposite side with a coupling system for mounting an ocular. Details relating to coupling the photometer with the beam of the microscope and constructional details are defined in the claims of the patent.

SUMMARY OF THE INVENTION

It is an object of the present invention to convert or complete microscopes having a photometer in order to enlarge their applicability especially for scanning and microspectral photometry and so as to make them useful in this domain.

This object is achieved by providing means between the photometer system and the beam splitter in the intermediate tube of the microscope for the purpose of changing preferably periodically the relative position of the transiting beam and of the image of the measuring stop with respect to the microscope image. This means comprises a scanning system including an oscillating mirror, the scanning system preferably being mounted in its own housing. The oscillating mirror advantageously is designed as a spherical mirror and is provided with means for oscillating in two mutually orthogonal directions. In addition an image-rotating prism or an image-rotating system consisting of a prism and a spherical mirror may be additionally provided in the same or in another housing. Again a dummy or matching housing may be provided for mechanical matching, which when appropriate may be equipped with transmitting and/or matching optics. It is furthermore possible to additionally provide means for pre-selecting a given, narrowly defined wavelength range for a controlled examination of the object. Such means may comprise a monochromator system preferably mounted in its own housing. Appropriately this monochromator system is provided with an interchangeable, dispersing component which, when in its operational position, can change its relative position to a beam from a concave mirror. This dispersing component may be mounted so that it has the capability of oscillating about its axis. Lastly, an integrable, spatially fixed plane mirror may be provided in lieu of the dispersing component.

BRIEF DESCRIPTION OF THE DRAWINGS

The present invention may best be explained by reference to the appended drawings, wherein:

FIG. 3 shows a photometer built up from interchangeable assemblies and including the scanning accessory with oscillating mirror;

FIG. 4 shows a photometer built up from interchangeable assemblies with a scanning accessory comprising an oscillating spherical mirror;

FIG. 5a is a housing with a device for rotating the light beam;

FIG. 5b is a housing with a device for rotating and/or oscillating the light beam;

FIG. 7b is a combination of FIGS. 6b and 7a; and

DESCRIPTION OF THE PREFERRED EMBODIMENTS

Figure 1:
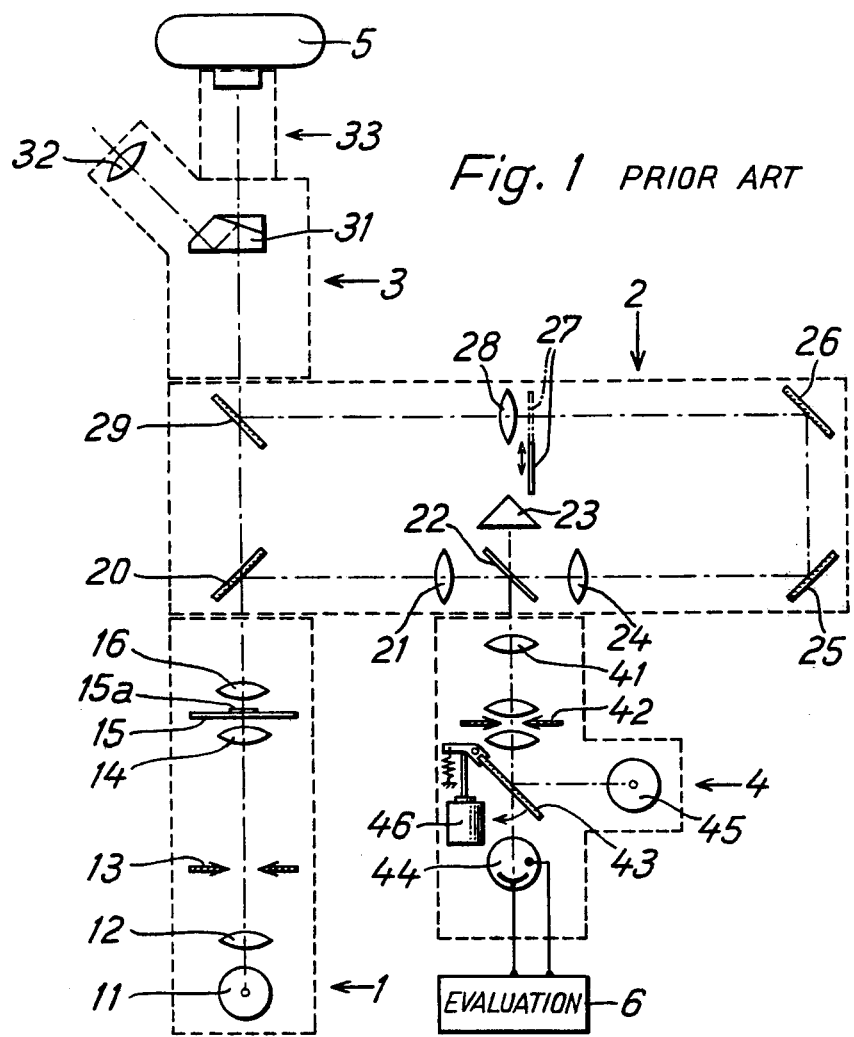
FIG. 1 is a schematic showing of the light beam path of the microscope according to U.S. Pat. No. 3,851,949, equipped with the connected assembly of intermediate tube photometer.

In FIG. 1, the subassembly 1 comprises the illuminator, the stage and the objectives. Subassembly 2 is the intermediate tube. Subassembly 3 comprises the ocular tube of the microscope with the binocular and subassembly 4 is the photometer. Subassembly 5 is a camera and subassembly 6 is a device for the electronic evaluation of the measuring values.

The light from lamp 11 illuminates, via a field lens 12, a radiant field stop 13, as well as a condenser 14, the object 15a disposed on a slide 15. This object 15a is reproduced by an objective 16, via a mirror 20, into an intermediate image plane of the ocular 21 and from there onto a beam splitter 22. This beam splitter branches off a part of the light into the subassembly 4. The light passing through the beam splitter produces an image of the object in the intermediate image plane of the ocular 24. The imaging beam path is guided, via deflecting mirrors 25, 26, an intermediate optic 28, as well as a further deflecting mirror 29, into the subassembly 3. The imaging beam path is split up in subassembly 3 into two components by means of a prism 31, one of which components is conducted to the ocular 32, and the other of which is guided to camera 5.

The imaging of measuring stop 42, provided in the subassembly 4, is effected by illuminating this stop by a light source 45 via the folding reflector 43. The beam of light rays leaving the stop is reproduced, via a lens 41, as well as through the beam splitter 22, on the triple reflector 23 and reflected by the latter. The reflected light is introduced, by the splitter 22, into the light beam path of the intermediate tube and thus passes to the ocular 32.

As can be seen, the folding mirror 43 is connected to a solenoid system 46, which system, after connection to a current source, controls the folding motion of the mirror so that the latter opens up the optical path to the photomultiplier 44.

A light stop 27 is provided in the intermediate tube and this light stop is inserted in the beam path of the intermediate tube when the optical path to the photomultiplier 44 has been opened up by the folding mirror. Thus, light is prevented from passing, during the photometric measurement, via the ocular 32 to the photomultiplier, thus falsifying the measuring value. The light stop can be controlled together with the folding mirror either manually or with a solenoid. The evaluation of the measuring values delivered by the photomultiplier is effected in subassembly 6 which comprises an analog-to-digital converter.

Figure 2:
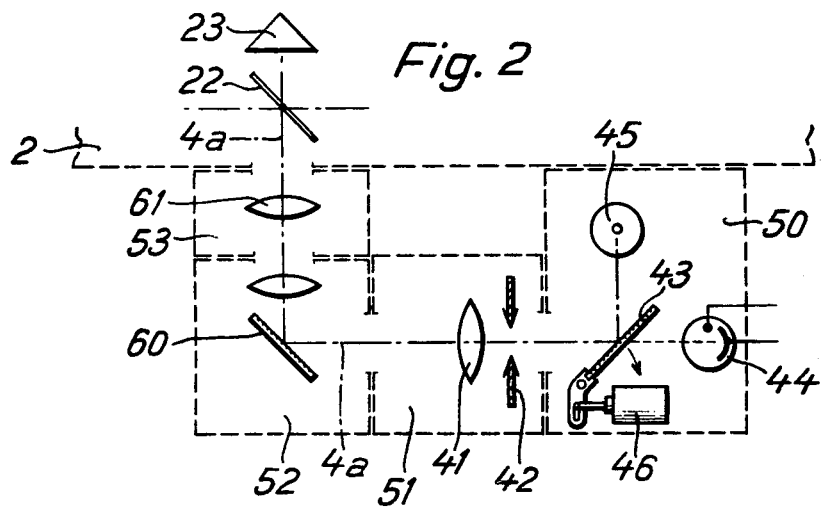
FIG. 2 shows the physical construction of the photometer of FIG. 1 in modular form according to the present invention.

Components of FIG. 1 are shown in FIG. 2, however, in this case they are mounted in separate and mutually attachable housings 50, 51. To deflect beam 4a toward beam splitter 22 or triple mirror 23 of the intermediate tube 2, a deflecting mirror 60 mounted in housing 52 is provided. A dummy housing 53 holding optics 61 provides both the optical and the mechanical spatial connection to the microscope's intermediate tube 2.

FIG. 3 shows the same arrangement of housings 50, 51, 53. Housing 52 of FIG. 2 is replaced in this instance by housing 54 enclosing a scanning system. This scanning system consists of a deflecting mirror, a spatially fixed concave mirror 63, a plane mirror 64a capable of oscillating about the mutually orthogonal axes 64b or 64d in the manner indicated by arrows 64c, 64e. The scanning system further comprises optics 65 and entry slit 66. FIG. 3 shows mirror 64a in the null position. When mirror 64a oscillates about axis 64b, which is perpendicular to the plane of the drawing, scanning of one line takes place. When mirror 64a rotates about axis 64d, which lies in the plane of the drawing and orthogonal to axis 64b by a discrete angle, a line change is obtained. Scanning along this new line then takes place for instance again by oscillating mirror 64a about its axis 64b. Clearly it is also possible to select axis 64d as the scanning axis and axis 64b as the rotating axis for the line change.

FIG. 4 shows housing 54 replaced by housing 55 which holds a similar scanning system. In its simplest form this scanning system consists of a concave mirror 67 rotating about axis 67b and capable of oscillating in the directions shown by double arrow 67a by means of a drive system as disclosed in the German Application Published For Opposition DT-AS No. 1,256,436. These oscillations act as a scanning motion on beam 4a. Axis 67b is perpendicular to the plane of the drawing. A deflecting mirror 68 provides the optical linkage between spherical mirror 67 and measuring stop 67. Again line changing is carried out so that for instance the mirror rotates in the manner shown by double arrow 67d about an axis 67c which is perpendicular to axis 67b and tangent to concave mirror 67.

Housing 53 is present in all the above described embodiments and it serves merely to provide the optical or mechanical spatial connection between the particular last functional assembly 52 or 54 or 55 and intermediate tube 2 of the microscope. Obviously another housing may replace housing 52 which would hold not only the components transmitting the beam but also those that would control it. Examples of these latter components are shown in FIGS. 5a and 5b.

FIG. 5a shows a housing 56 holding an Abbe-Koenig prism 69. When the latter is rotated in the direction of arrow 69a about the beam axis, the transmitted beam also experiences a corresponding rotation.

FIG. 5b shows a housing 57 holding a prism 70 with full-mirrored roof surfaces in combination with a concave mirror 71. By rotating this combination about the optical axis 4a of the assembly–see rotating arrow 70a–again rotation of the transmitted beam is achieved. Furthermore it is possible to control the relative arrangement of prism 70 and spherical mirror 71. This is achieved by movably supporting concave mirror 71 similarly to concave mirror 67 in FIG. 4. Concave mirror 71 can carry out an oscillatory motion about axis 71b perpendicular to the plane of the drawing and this is shown by double arrow 71a. Thereby scanning along a line is made possible. When concave mirror 71 is rotated about an axis 71c in the manner indicated by double arrow 71d, where axis 71c is perpendicular to axis 71b and is tangent to concave mirror 71, a line change is obtained.

Operation of the scanning system shown in FIGS. 3, 4, 5a and 5b is described in further detail with relation to FIGS. 6a, 6b, 7a and 7b.

Figure 6A:
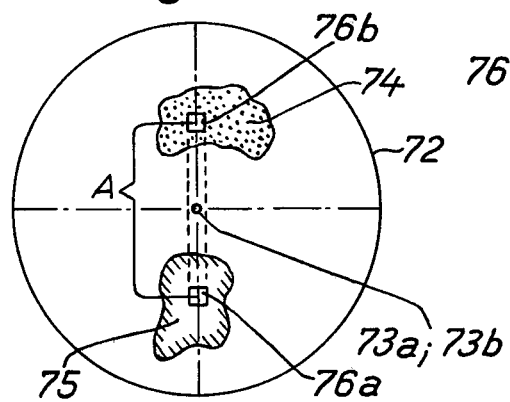
FIG 6a is a microscope viewing field with a center-symmetrical measuring-stop trace without azimuthal offset.

FIG. 6a shows the field of view or microscope image 72 of the microscope with its center 73 bounded by a circle. An object being measured 74 and the reference object 75 are shown. The image of measuring stop 42 is denoted by reference numeral 76a in the reference object region 75 and with reference numeral 76b in the region of the object being measured. It must be emphasized that this is a representation for a particular time, because at time $t_a$ the image of the measuring stop 76a for instance is actually located at its first end position of the measuring stop trace in the region of the reference object 75, whereas at a later time $t_b$ the measuring stop image is located at the end position of the measuring stop trace denoted by reference numeral 76b. The distance between end position 76a and 76b therefore is a measure of the amplitude A of one line scan.

The relative positions of the microscope image 72 and the images 76a and 76b of the measuring stop 42 are defined by two different positions of the concave mirror 67 in FIG. 4 or plane mirror 64a in FIG. 3 or spherical mirror 71 in FIG. 5b respectively. The above case relates to line-scanning which is symmetrical with respect to the center point 73a of the field of view. This center-symmetrical line scanning may be achieved for instance using the combination 70, 71 of the prism and concave mirror shown in FIG. 5b when the concave mirror 71 in its null position (as shown) is symmetrically located with respect to prism 70. For this null position, the measuring stop image and the center 73a of the field of view coincide. A full excursion of oscillating concave mirror 71 causes the measuring stop image to be positioned at 77a and the other full excursion position causes the measuring stop image to be located at 76b. By adjusting the oscillation amplitude A of the oscillating concave mirror 71, the microscope user may always adapt himself to the idiosyncrasies of the microscope image. Therefore, as shown by FIG. 6a, oscillation null point 73b of mirror 71 always coincides with center 73a of the field of view because of symmetry.

Figure 6B:
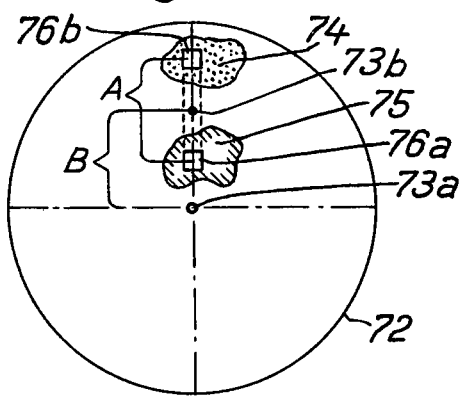
FIG. 6b is the same field of view of FIG. 6a but with an asymmetrical measuring-stop trace.

The two object regions 74, 75 to be compared are localized in FIG. 6b so that the oscillation null point 73b of scanning mirror 71 no longer coincides with the center 73a of the field of view. The deviation is denoted by B. The oscillation amplitude of mirror 71 again is denoted by A, as can be seen by comparing with FIG. 6a, it was selected to be significantly smaller. The offset B may be arbitrarily adjusted by changing the null position of mirror 71. This means that the concave mirror 71 assumes an asymmetrical initial (null) position with respect to its associated prism 70. This additional possibility of adjustment therefore enhances the number of variations when relating the measuring stop image to specific object details.

Figure 7A:
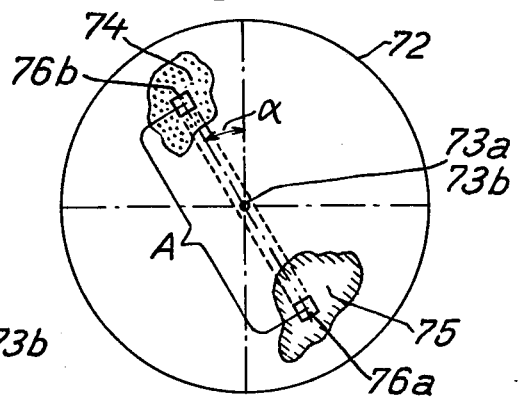
FIG. 7a is the same field of view of FIG. 6a but with azimuthal offset.

FIG. 7a shows another variation which differs from the embodiment sketched in FIG. 6a by the centrally symmetric measuring stop trace (represented by the amplitude of oscillation A) being azimuthally rotated by an angle alpha about the center 73a. This can be achieved by rotating assembly 56 or 57 about its optical axis 4a.

Figure 7B:
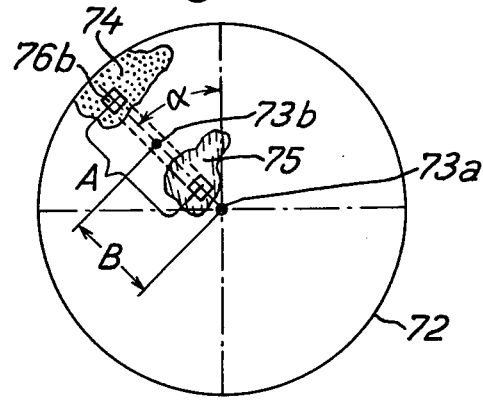

Lastly FIG. 7b shows another adjustment possibility relating to a combination of the individual modes represented in FIGS. 6a and 7a.

The use of measuring stop image 76a, 76b or of the measuring stop trace A in relation to the particular object details 74, 75 which are to be measured or compared in the microscope image was already explained in relation to FIGS. 6a, 6b, 7a and 7b and the optical system shown in FIG. 5b, the combination of components 70 and 71 rotating about axis 4a and permitting the basic modes of scanning AND rotation (azimuthal offset) of the beam. On the other hand, housing 56 may replace housing 53 in FIG. 3, whereby the basic modes of scanning AND rotation may also be carried out when the scanning system and the rotating prism system operate jointly in housing 56. The same considerations apply if the assembly 56 is used in lieu of the assembly 53 shown in FIG. 4.

The measurement signals obtained during the photometric measurements are recorded or stored as disclosed in the Leitz-Prospect "Microscope photometer" (620–18b/Engl.), April, 1973.

Therefore a double-beam accessory may be achieved using this scanning accessory with microscope photometers to the art, including the latest ones, and this can be done simply, provided a first object region to be measured is selected as the reference object 75 and a second region as the measurement object 74. A galvanometer mirror is appropriately used as the oscillatory mirror, and preferably it is held in gimbals.

The advantages of this accessory especially consist in enlarging the applications of the state of the art of microscope photometers. This double-beam accessory permits rectilinear transmission of the microscope beam without requiring the insertion of further splitting surfaces. The amplitude, frequency of oscillation and null position of oscillating mirror 64a or 67 or 71 may be adjusted electrically as disclosed in the German Application Published For Opposition DT-AS No. 1,256,436.

It is furthermore advantageous to locate the mirror's point of rotation at the site of a pupil first image so that the pupil image remains stationary on photoelectric detector 44. The combination of prism 70 and mirror 71 is provided with three reflecting surfaces. This combination offers the advantage over similar systems with four reflecting surfaces that the exiting beam forms an angle of 2 α with respect to the optical axis when the mirror rotates by α. This allows small and sufficient amplitudes of oscillations of the scanning mirror, which in the ultimate analysis benefits the optical image quality. Finally, as regards a microscope photometer of the initially cited kind, and which is equipped with a double-beam scanning accessory properly inserted, one is given the possibility of simultaneously ascertaining the microscope object and the positions of the comparison and measuring beams, whereby the setting of the object sites to be field-stopped is greatly facilitated.

Even though the individual mode assemblies are mounted in single, separate housings in the examples, it is nevertheless possible to consolidate mode assemblies into one housing. For instance the assemblies of housings 55 and 56 may be consolidated into one housing provided the desired measuring mode is unimpaired.

It is appropriate for special-case object examinations that the light beam entering intermediate tube 2 is not polychromatic, but rather split by means of a dispersing element into discrete, selective and predetermined wave lengths. Such a monochromator system as disclosed in the Leitz-Prospect "Microscope photometer" (620–18-b/Engl.), April 1973 may be embodied for instance using the construction of housing 54 shown in FIG. 3 in combination with housing 57 from FIG. 5b when a dispersing element such as a prism or a grating 64 replaces the oscillating mirror 64a.

Figure 8:
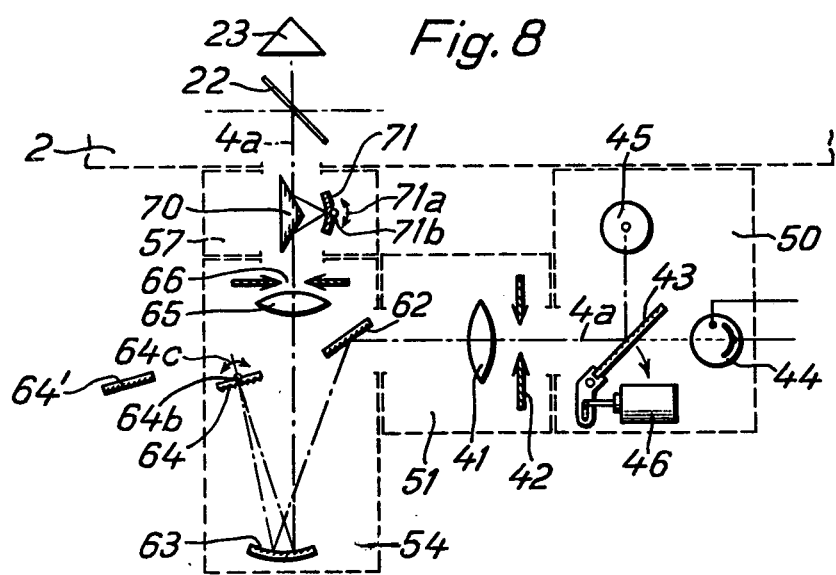
FIG. 8 is a photometer consisting of interchangeable modules with a monochromator system.

FIG. 8 shows such an apparatus consisting of a scanning accessory with a monochromator. The dispersion grating 64 is rotatably mounted about an axis 64b which is perpendicular to the plane of the drawing. When performing automatic measurements, it is possible, for instance when recording spectra, to set the dispersing element by motor means. Furthermore, it is possible to mount dispersing element 64 so that it can carry out oscillating motions about axis 64b in the manner of a galvanometer mirror. This additional monochromator system makes it possible to obtain the stop image precisely in that color corresponding to the instantaneously set wavelength of the monochromator. Therefore the user may estimate visually whether there is sufficient contrast for a photometric comparison measurement.

When the pivoting grating 64 is replaced by a spatially fixed mirror 64', then the light from the object is no longer resolved spectrally and the entire light flux is available for a photometric measurement. When this plane mirror 64' is pivoted, the light beam carries out a corresponding scanning motion, as shown in further detail in relation to FIG. 3.

We claim:
1. In a microscope apparatus comprising:
   (a) first optical means defining a main optical path for microscopic examination of an object positioned on a stage, said first optical means comprising in a first subassembly an illuminator with a field lens and a radiant field stop, a condenser, and an objective positioned in a first housing; in a second subassembly, mirrors, optical lenses, and a movable light blocking stop, defining a folded portion of the main optical path and positioned in a laterally extending intermediate tube coupled to said first housing;
   (b) second optical means for dividing said main optical path into an observation path and a measurement path, one of which is angularly displaced from said main path, said second optical means comprising a beam splitter and a triple mirror positioned in said intermediate tube;
   (c) third optical means defining a restrictive aperture the area of which may be varied, said third optical means comprising a measuring stop, said aperture being located in said measurement path between a folding mirror and a lens, said beam splitting means causing an image of said aperture to be formed in said observation path;

(d) fourth optical means for ocular observation comprising an ocular positioned in an ocular tube coupled to said intermediate tube for simultaneously observing the images of said object and of said aperture, said image of said aperture positioned to indicate that portion of said object from which the illumination will be measured;

(e) fifth optical means for illuminating said aperture to permit observation thereof, said optical means comprising a light source and said folding mirror;

(f) sixth optical means positioned in said measurement path to photometrically receive and measure the intensity of light from said main optical path after passage of said light through said lens and said measuring stop and impingement on a photomultiplier; and (g) said triple mirror positioned in said measurement path and located after said beam splitter in said intermediate tube for reflecting the image of said aperture into said observation path; the improvement comprising:

(h) means for periodically changing the relative position of said measurement path, said means positioned in said measurement path between said beam splitter and said measuring stop.

2. A scanning accessory for a microscope photometer in combination with a microscope having an intermediate tube with a beam therein, a photometer system mounted to or inside the intermediate tube and having a measurement stop and a measurement path deflected from the beam, the intermediate tube is provided near or at the one end of its lower side with a coupling system for mounting to a stand and at the opposite side with a coupling system for mounting an ocular, the ocular viewing a microscope image, the photometer system being inserted into the beam of the intermediate tube by means of a beam splitter, a subsequent triple mirror and the ocular, the improvement comprising: means for periodically changing the relative position of said measurement path (4a) and an image (76a, 76b) of said measuring stop (42) with respect to said microscope image (72), said means provided between said photometer system (41–46) and said beam splitter (22) mounted inside said intermediate tube (2) for the purpose of enlarging the application possibilities of said microscope photometer.

3. The accessory of claim 2, wherein said means comprise a scanning system (62, 63, 64a, 67, 68, 70, 71) with an oscillating mirror (64, 67, 71).

4. The accessory of claim 2, wherein said means comprise a scanning system (62, 63, 64a, 67, 68, 70, 71) with an oscillating mirror (64a, 67, 71) which are mounted in their own housings (54, 55, 57).

5. The accessory of claim 3, wherein said oscillating mirror is a spherical mirror (67, 71) equipped with means for oscillating in two mutually orthogonal directions (64b/64c, 64d/64e; 67b/67a, 67c/67d; 71b/71a, 71c/71d).

6. The accessory of claim 4, wherein an image rotating prism (69) is held additionally in the same housing (54, 55).

7. The accessory of claim 4, wherein an image rotating prism (69) is held additionally in a separate housing (56, 57).

8. The accessory of claim 4, wherein an image rotating assembly consisting of a prism (70) and of a concave mirror (71) is held additionally in the same housing (54,55).

9. The accessory of claim 4, wherein an image rotating assembly consisting of a prism (70) and of a concave mirror (71) is held additionally in a separate housing (56, 57).

10. The accessory of claim 3, wherein a dummy housing (53) with transmitting and matching optics, is provided for mechanical matching.

11. The accessory of claim 3, wherein a dummy housing (53) with matching optics, is provided for mechanical matching.

12. The accessory of claim 3, wherein additional means for preselecting a specific, narrowly bounded range of wavelengths are provided for a controlled object examination.

13. The accessory of claim 12, wherein said additional means comprise a monochromator system (62–66) mounted in its own housing (54).

14. The accessory of claim 13, wherein said monochromator system is provided with an exchangeable, dispersing component (64) which in its operative position is capable of changing its relative position with respect to a light beam from a concave mirror (63).

15. The accessory of claim 14, wherein said dispersing component is mounted with means to carry out oscillating motions about its axis (64b).

16. The accessory of claim 13, wherein said monochromator system is provided with an integrable, spatially fixed plane mirror (64').

* * * * *